(12) United States Patent
Iwasa et al.

(10) Patent No.: US 7,318,981 B2
(45) Date of Patent: *Jan. 15, 2008

(54) SECONDARY BATTERY WITH A NITROXYL POLYMER ACTIVE MATERIAL

(75) Inventors: Shigeyuki Iwasa, Tokyo (JP); Hiroyuki Nishide, Tokyo (JP)

(73) Assignee: NEC Corporation, Tokyo (JP)

( * ) Notice: Subject to any disclaimer, the term of this patent is extended or adjusted under 35 U.S.C. 154(b) by 168 days.

This patent is subject to a terminal disclaimer.

(21) Appl. No.: 10/519,933

(22) PCT Filed: Mar. 1, 2004

(86) PCT No.: PCT/JP2004/002468

§ 371 (c)(1),
(2), (4) Date: May 25, 2005

(87) PCT Pub. No.: WO2004/077593

PCT Pub. Date: Sep. 10, 2004

(65) Prior Publication Data

US 2005/0260500 A1    Nov. 24, 2005

(30) Foreign Application Priority Data

Feb. 28, 2003    (JP)    .............................. 2003/053885

(51) Int. Cl.
*H01M 4/60* (2006.01)
(52) U.S. Cl. ...................................... 429/213
(58) Field of Classification Search ................. 429/213
See application file for complete search history.

(56) References Cited

U.S. PATENT DOCUMENTS

| 6,866,964 B2 * | 3/2005 | Nakahara et al. | ............ 429/213 |
| 7,122,277 B2 * | 10/2006 | Morioka et al. | ............ 429/213 |
| 2003/0044681 A1 * | 3/2003 | Morioka et al. | ............ 429/213 |
| 2004/0115529 A1 * | 6/2004 | Nakahara et al. | ............ 429/213 |
| 2004/0248004 A1 * | 12/2004 | Iwasa et al. | ................. 429/213 |
| 2005/0170247 A1 * | 8/2005 | Nakahara et al. | ............ 429/213 |

FOREIGN PATENT DOCUMENTS

| JP | 2002-117854 | * | 4/2002 |
| JP | 2002-304996 | * | 10/2002 |
| JP | 2003-022809 A | | 1/2003 |
| JP | 2003-36849 A | | 2/2003 |
| JP | 2003-132891 A | | 5/2003 |
| WO | WO 02/082570 | * | 10/2002 |

* cited by examiner

Primary Examiner—Mark Ruthkosky
(74) Attorney, Agent, or Firm—Sughrue Mion Pllc.

(57) ABSTRACT

A secondary battery, that has an excellent charge and discharge cycle characteristics, with a larger capacity, is provided. The secondary battery having a positive electrode, negative electrode and electrolyte, includes a polymer having a repeating unit represented by a formula (1) as an active material of at least one of positive electrode and negative electrode.

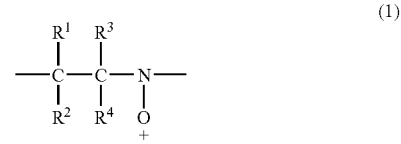

(1)

According to formula (1), R1, R2, R3 and R4 each independently represents hydrogen atom, substituted or unsubstituted alkyl group, substituted or unsubstituted aromatic hydrocarbons, substituted or unsubstituted hetroaromatic groups, halogen atom, or alkylene group that may be coupled to the ring form either one or both of R1 and R3, R2 and R4.

12 Claims, 1 Drawing Sheet

SECONDARY BATTERY WITH A NITROXYL POLYMER ACTIVE MATERIAL

TECHNICAL FIELD

The present invention relates to a secondary battery, particularly, it relates to a secondary battery with a higher energy density, a larger capacity, and an excellent charge and discharge stability.

BACKGROUND OF THE ART

For explaining more sufficiently the technical standards relating to the present invention at this point, the patents, the patent applications, the patent gazettes, and the scientific papers being cited or specified in the present application, are incorporated herein by reference in its entirely. In recent years, as markets for small or portable electronic devices such as a laptop personal computer and a cellular phone have been rapidly expanded, there have been increasing requirements for a small-weight and a large-capacity of the battery used in these devices. To satisfy the requirements, the secondary batteries are extensively being developed, which utilizes an electrochemical reaction associated with charge transfer on alkali-metal ions as a charge carrier, such as lithium ions. Among them, a lithium-ion secondary battery has been used in a variety of electronic devices as a large-capacity battery with an excellent stability and a higher energy density. Such a lithium-ion secondary battery uses a lithium-containing transition metal oxide, such as lithium manganese oxide and lithium cobalt oxide, in a positive electrode as active materials and a carbon in a negative electrode, and performs charge and discharge utilizing insertion and extraction reactions of lithium ions to these active materials. However, since this lithium-ion secondary battery uses a metal oxide with a large specific gravity particularly in a positive electrode, there's much room for improvement in the battery capacity per unit weight. There have been, therefore, attempts for developing a large-capacity battery using a lighter electrode material.

For example, according to the specifications of U.S. Pat. No. 4,833,048 and Japanese Patent No. 2,715,778, a battery using an organic compound having a disulfide bond in a positive electrode have been disclosed. It utilizes, as a principle of a battery, an electrochemical oxidation-reduction reaction associated with formation and dissociation of a disulfide bond. These batteries use electrode materials comprised of elements with a smaller specific gravity such as sulfur and carbon as main components. These materials are effective to some extent in providing a large-capacity battery with a higher energy density. However, the problem remains that the capacity is liable to decrease after repeating the charge and discharge cycle, due to a diffusion of active material to electrolyte solution, and that the efficiency in reformation of a dissociated bond is small.

On the other hand, as a battery utilizing an organic compound, a battery using a conductive polymer as an electrode material, has also been suggested. This is a battery whose principle is doping and undoping reactions of electrolyte ions on the conductive polymer. The doping reaction as used herein is a reaction of stabilizing excitons such as charged solitons and polarons generated by oxidation or reduction of a conductive polymer by counter ions. On the other hand, a undoping reaction as used herein refers to a reaction which is opposite to the above doping reaction and in which excitons stabilized by counter ions are electrochemically oxidized or reduced. According to the specification of U.S. Pat. No. 4,442,187, a battery using conductive polymer such as this as a positive electrode or negative electrode material is disclosed. This battery is comprised of elements with a smaller specific gravity such as carbon and nitrogen only. Its development as a large-capacity battery has been expected.

A conductive polymer, however, has a property that excitons generated by oxidation or reduction are delocalized over a wide region of π-electron conjugated system and interacted with each other. It results in a limitation to a concentration of excitons generated, and therefore, a capacity of a battery is restricted. Thus, a battery using a conductive polymer as an electrode material is effective to some extent in terms of weight reduction, but there's much room for improvement in terms of increase in a capacity.

As described above, there have been various proposals for a battery which does not use a transition metal containing active material, in an attempt to achieve a large-capacity battery. There have been, however, provided no stable batteries with a higher energy density and a large capacity yet.

As described above, in a lithium-ion battery using a transition metal oxide in a positive electrode, a specific gravity of the element is high that it has been theoretically difficult to prepare a battery with a larger capacity than that currently used. There have been various proposals for a battery which does not use a transition metal containing active material, in an attempt to achieve a large-capacity battery. There have been, however, provided no stable batteries with a higher energy density and a large capacity yet.

DISCLOSURE OF THE INVENTION

An object of the present invention is to provide a secondary battery with superior charge and discharge cycle characteristics, a higher energy density, and a larger capacity.

As a result of extensive and thorough research, the inventors found out that a specific organic compound which was not utilized as an active material of an electrode despite of the fact that it is being comprised of low-weight atoms only, that is, a polymer having a repeating unit represented by formula (1) inside the molecule, can be used as an active material of the electrode. According to the present invention, by using a polymer having a repeating unit represented by formula (1) inside the molecule, a large-capacity and higher density of electrode is obtained, therefore, providing higher energy density, larger capacity and excellence in charge and discharge stability.

That is, according to the present invention, a secondary battery having at least a positive electrode, a negative electrode and an electrolyte, wherein an active material of at least one of the positive electrode and the negative electrode includes a polymer having a repeating unit represented by formula (1).

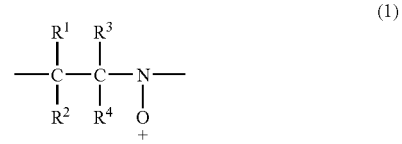

(Referring to formula (1), R1, R2, R3 and R4 each independently represents hydrogen atom, substituted or unsubstituted alkyl group, substituted or unsubstituted aromatic hydrocarbons, substituted or unsubstituted hetroaromatic groups, halogen atom, or alkylene group that may contain either one or both of R1 and R3, and R2 and R4, forming a ring.)

In addition, the present invention relates to a secondary battery containing a polymer as a positive electrode active material.

Referring to the secondary battery, since an electrode active material is oxidized or reduced by the electrode reaction, the electrode active material may take form either in a starting state and an oxidized or reduced state.

In the present invention, a polymer is contained in the electrode either in a starting state and oxidized or reduced state.

In other words, the present invention relates to a secondary battery characterized by a polymer having a repeating unit represented by formula (1) as a reactant or product of an electrode reaction of at least one of the positive electrode and the negative electrode. According to another aspect of the present invention it relates to the secondary battery having the polymer as a reactant or product of the positive electrode reaction.

In another aspect of the present invention, it relates to a secondary battery which is characterized by a compound obtained by forming a polymer having a repeating unit represented by formula (1) which is contained in at least one of the reactions of the positive electrode and negative electrode. The polymer is contained in the electrode as an intermediate body of the electrode reaction. Also the present invention relates to the secondary battery containing the compound in a positive electrode.

In another aspect of the present invention, any one of the aforementioned secondary batteries is a lithium secondary battery.

According to the present invention, the polymer directly contributes to the electrode reaction of the positive electrode or negative electrode, and it is based on the fact that the polymer is excellent as an electrode active material. This is a polymer having a repeating unit represented by formula (1) inside the molecule causing reversibly stabilized oxidation and reduction reactions. That is, the charge and discharge is stabilized by using a polymer having a repeating unit represented by formula (1) inside the molecule as active material, capable of supplying a secondary battery with an excellent cycle characteristics. In addition, a polymer having a repeating unit represented by formula (1) inside the molecule is comprised of elements with small weight only such as carbon, nitrogen, hydrogen, and oxygen. Because of this, the weight of active material can be reduced. The electrode produced using this active material can increase the capacity density per unit weight, as a result of it, the battery produced using this active material can increase the energy density per unit weight.

The electrode that uses the polymer as active material is not limited to either one of positive electrode or negative electrode. However, from the notion of the energy density, in particular, this polymer is preferably used as the active material of the positive electrode. In addition to that, the secondary battery of the present invention is preferably a lithium secondary battery from the viewpoint of large capacity.

EMBODIMENTS OF THE INVENTION

Figure 1:
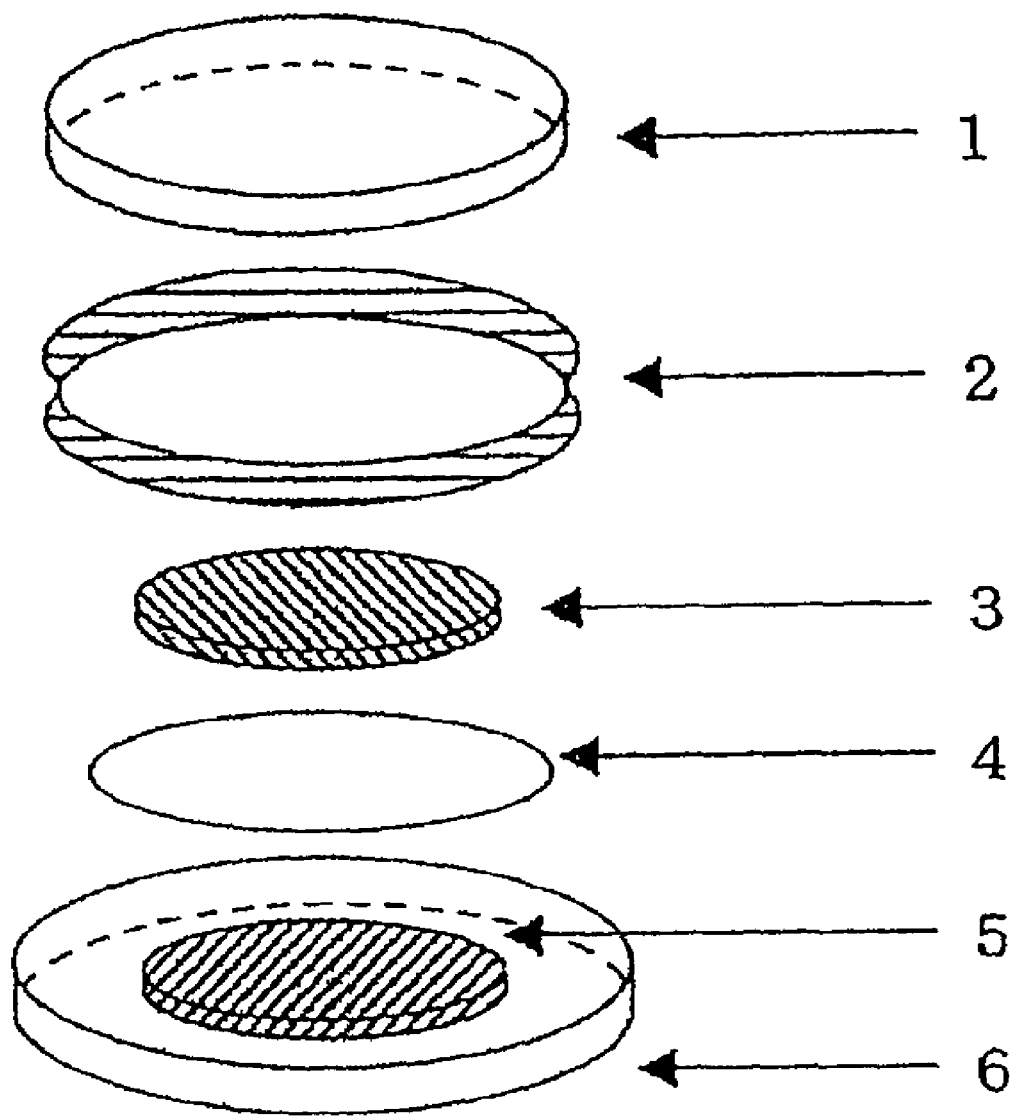
FIG. 1 is a plan view illustrating an embodiment of a battery configuration according to the present invention.

FIG. 1 shows a configuration of one embodiment of battery of the present invention. The battery, as depicted in FIG. 1, has a configuration where a negative electrode 3 formed on a negative collector 1 and a positive collector 6 formed on the positive electrode 5 are piled via a separator 4 including an electrolyte. Insulating filler 2 made of insulating material such as plastic resin, is positioned in between the negative collector 1 and the positive collector 6, for preventing the electrical contact of the two. Now, in the case of using gel electrolyte or solid electrolyte, replacing the separator, these electrolytes may be placed in between the electrodes.

In the present embodiment, under the configuration such as this, as active material used in negative electrode 3 or positive electrode 5 or both electrodes contains a polymer having a repeating unit represented by formula (1) inside the molecule.

In the light of battery capacity, a lithium secondary battery having an electrode containing a polymer having a repeating unit represented by formula (1) as the positive electrode active material is preferred.

[1] Active Materials

An electrode active material of the present invention as used herein refers to a material directly contributing to an electrode reaction such as charge and discharge reactions, and plays a main role in a battery system.

In the present invention, a polymer having a repeating unit represented by formula (1) can be used as the active material. Referring to formula (1), as substituted or unsubstituted alkyl group that may be straight, cyclic or branched, those having 1 to 10 carbon atoms are preferred. Specific examples include methyl group, ethyl group, propyl group, isopropyl group, n-butyl group, s-butyl group, isobutyl group, t-butyl group, n-pentyl group, n-hexyl group, n-heptyl group, n-octyl group, cyclopropyl group, cyclobutyl group, cyclopentyl group, cyclohexyl group, 4-methylcyclohexyl group, hydroxymethyl group, 1-hydroxyethyl group, 2-hydroxyethyl group, 2-hydroxyisobutyl group, 1,2-dihydroxyethyl group, 1,3-dihydroxyisopropyl group, 2,3-dihydroxy-t-butyl group, 1,2,3-trihydroxypropyl group, chloromethyl group, 1-chloroethyl group, 2-chloroethyl group, 2-chloroisobutyl group, 1,2-dichloroethyl group, 1,3-dichloroisopropyl group, 2,3-dichloro-t-butyl group, 1,2,3-trichloropropyl group, bromomethyl group, 1-bromoethyl group, 2-bromoethyl group, 2-bromoisobutyl group, 1,2-dibromoethyl group, 1,3-dibromoisopropyl group, 2,3-dibromo-t-butyl group, 1,2,3-tribromopropyl group, iodomethyl group, 1-iodoethyl group, 2-iodoethyl group, 2-iodoisobutyl group, 1,2-diiodoethyl group, 1,3-diiodoisopropyl group, 2,3-diiodo-t-butyl group, 1,2,3-triiodopropyl group, aminomethyl group, 1-aminoethyl group, 2-aminoethyl group, 2-aminoisobutyl group, 1,2-diaminoethyl group, 1,3-diaminoisopropyl group, 2,3-diamino-t-butyl group, 1,2,3-triaminopropyl group, cyanomethyl group, 1-cyanoethyl group, 2-cyanoethyl group, 2-cyanoisobutyl group, 1,2-dicyanoethyl group, 1,3-dicyanoisopropyl group, 2,3-dicyano-t-butyl group, 1,2,3-tricyanopropyl group, nitromethyl group, 1-nitroethyl group, 2-nitroethyl group, 2-nitroisobutyl group, 1,2-dinitroethyl group, 1,3-dinitroisopropyl group, 2,3-dinitro-t-butyl group, and 1,2,3-trinitropropyl group. These can be used alone, or in combination of more than two types.

Referring to formula (1), as substituted or unsubstituted aromatic hydrocarbon groups, those having 1 to 18 carbon atoms are preferred. Specific examples are phenyl group, 1-naphthyl group, 2-naphthyl group, 9-fluorenyl group, 1-anthryl group, 2-anthryl group, 9-anthryl group, 1-phenanthryl group, 2-phenanthryl group, 3-phenanthryl group, 4-phenanthryl group, 9-phenanthryl group, 1-naphthacenyl group, 2-naphthacenyl group, 9-naphthacenyl group, 1-pyrenyl group, 2-pyrenyl group, 4-pyrenyl group, 2-biphenylyl group, 3-biphenylyl group, 4-biphenylyl group, p-terphenyl-4-yl group, p-terphenyl-3-yl group, p-terphenyl-2-yl group, m-terphenyl-4-yl group, m-terphenyl-3-yl group, m-terphenyl-2-yl group, o-tolyl group, m-tolyl group, p-tolyl group, p-t-butylphenyl group, p-(2-phenylpropyl) phenyl group, 3-methyl-2-naphthyl group, 4-methyl-1-naphthyl group, 4-methyl-1-anthryl group, 4'-methylbiphenylyl group, 4''-t-butyl-p-terphenyl-4-yl group, and their derivatives. These can be used alone, or in combination of more than two types.

Referring to formula (1), as substituted or unsubstituted aromatic heterocyclic groups, those having 1 to 18 carbon numbers are preferred. Specific examples are 1-pyrrolyl group, 2-pyrrolyl group, 3-pyrrolyl group, pyrazinyl group, 2-pyridinyl group, 3-pyridinyl group, 4-pyridinyl group, 1-indolyl group, 2-indolyl group, 3-indolyl group, 4-indolyl group, 5-indolyl group, 6-indolyl group, 7-indolyl group, 1-isoindolyl group, 2-isoindolyl group, 3-isoindolyl group, 4-isoindolyl group, 5-isoindolyl group, 6-isoindolyl group, 7-isoindolyl group, 2-furyl group, 3-furyl group, 2-benzofuranyl group, 3-benzofuranyl group, 4-benzofuranyl group, 5-benzofuranyl group, 6-benzofuranyl group, 7-benzofuranyl group, 1-isobenzofuranyl group, 3-isobenzofuranyl group, 4-isobenzofuranyl group, 5-isobenzofuranyl group, 6-isobenzofuranyl group, 7-isobenzofuranyl group, 2-quinolyl group, 3-quinolyl group, 4-quinolyl group, 5-quinolyl group, 6-quinolyl group, 7-quinolyl group, 8-quinolyl group, 1-isoquinolyl group, 3-isoquinolyl group, 4-isoquinolyl group, 5-isoquinolyl group, 6-isoquinolyl group, 7-isoquinolyl group, 8-isoquinolyl group, 2-quinoxalinyl group, 5-quinoxalinyl group, 6-quinoxalinyl group, 1-carbazolyl group, 2-carbazolyl group, 3-carbazolyl group, 4-carbazolyl group, 9-carbazolyl group, 1-phenanthridinyl group, 2-phenanthridinyl group, 3-phenanthridinyl group, 4-phenanthridinyl group, 6-phenanthridinyl group, 7-phenanthridinyl group, 8-phenanthridinyl group, 9-phenanthridinyl group, 10-phenanthridinyl group, 1-acridinyl group, 2-acridinyl group, 3-acridinyl group, 4-acridinyl group, 9-acridinyl group, 1,7-phenanthrolin-2-yl group, 1,7-phenanthrolin-3-yl group, 1,7-phenanthrolin-4-yl group, 1,7-phenanthrolin-5-yl group, 1,7-phenanthrolin-6-yl group, 1,7-phenanthrolin-8-yl group, 1,7-phenanthrolin-9-yl group, 1,7-phenanthrolin-10-yl group, 1,8-phenanthrolin-2-yl group, 1,8-phenanthrolin-3-yl group, 1,8-phenanthrolin-4-yl group, 1,8-phenanthrolin-5-yl group, 1,8-phenanthrolin-6-yl group, 1,8-phenanthrolin-7-yl group, 1,8-phenanthrolin-9-yl group, 1,8-phenanthrolin-10-yl group, 1,9-phenanthrolin-2-yl group, 1,9-phenanthrolin-3-yl group, 1,9-phenanthrolin-4-yl group, 1,9-phenanthrolin-5-yl group, 1,9-phenanthrolin-6-yl group, 1,9-phenanthrolin-7-yl group, 1,9-phenanthrolin-8-yl group, 1,9-phenanthrolin-10-yl group, 1,10-phenanthrolin-2-yl group, 1,10-phenanthrolin-3-yl group, 1,10-phenanthrolin-4-yl group, 1,10-phenanthrolin-5-yl group, 2,9-phenanthrolin-1-yl group, 2,9-phenanthrolin-3-yl group, 2,9-phenanthrolin-4-yl group, 2,9-phenanthrolin-5-yl group, 2,9-phenanthrolin-6-yl group, 2,9-phenanthrolin-7-yl group, 2,9-phenanthrolin-8-yl group, 2,9-phenanthrolin-10-yl group, 2,8-phenanthrolin-1-yl group, 2,8-phenanthrolin-3-yl group, 2,8-phenanthrolin-4-yl group, 2,8-phenanthrolin-5-yl group, 2,8-phenanthrolin-6-yl group, 2,8-phenanthrolin-7-yl group, 2,8-phenanthrolin-9-yl group, 2,8-phenanthrolin-10-yl group, 2,7-phenanthrolin-1-yl group, 2,7-phenanthrolin-3-yl group, 2,7-phenanthrolin-4-yl group, 2,7-phenanthrolin-5-yl group, 2,7-phenanthrolin-6-yl group, 2,7-phenanthrolin-8-yl group, 2,7-phenanthrolin-9-yl group, 2,7-phenanthrolin-10-yl group, 1-phenazinyl group, 2-phenazinyl group, 1-phenothiazinyl group, 2-phenothiazinyl group, 3-phenothiazinyl group, 4-phenothiazinyl group, 10-phenothiazinyl group, 1-phenoxazinyl group, 2-phenoxazinyl group, 3-phenoxazinyl group, 4-phenoxazinyl group, 10-phenoxazinyl group, 2-oxazolyl group, 4-oxazolyl group, 5-oxazolyl group, 2-oxadiazolyl group, 5-oxadiazolyl group, 3-furazanyl group, 2-thienyl group, 3-thienyl group, 2-methylpyrrol-1-yl group, 2-methylpyrrol-3-yl group, 2-methylpyrrol-4-yl group, 2-methylpyrrol-5-yl group, 3-methylpyrrol-1-yl group, 3-methylpyrrol-2-yl group, 3-methylpyrrol-4-yl group, 3-methylpyrrol-5-yl group, 2-t-butylpyrrol-4-yl group, 3-(2-phenyipropyl) pyrrol-1-yl group, 2-methyl-1-indolyl group, 4-methyl-1-indolyl group, 2-methyl-3-indolyl group, 4-methyl-3-indolyl group, 2-t-butyl-1-indolyl group, 4-t-butyl-1-indolyl group, 2-t-butyl-3-indolyl group, 4-t-butyl-3-indolyl group, and their derivatives. These can be used alone, or in combination of more than two types.

Referring to formula (1), examples of halogen atoms include fluorine, chlorine, bromine and iodine. One of these atoms or two or more atoms in combination can be used.

Referring to formula (1), examples of cyclic alkylene group include ethylene group (—$CH_2CH_2$—), trimethylene group (—$CH_2CH_2CH_2$—), tetramethylene group, pentamethylene group, hexamethylene group, heptamethylene group, propylene group (—$CH(CH_3)CH_2$—), butylene group, pentylene group, hexlene group, and heptylene group.

The secondary structure of a polymer having a repeating unit represented by formula (1) contained in the electrode of the present invention can be any one of straight, branched, or cyclic structure. In addition, although its average molecular weight is not particularly limited, not less than 1000 is preferred. This is because the solubility of the polymer in the electrolyte solution used in the battery decreases, and the charge and discharge cycle stability gets high.

Examples of the repeating unit represented by formula (1) follows below.

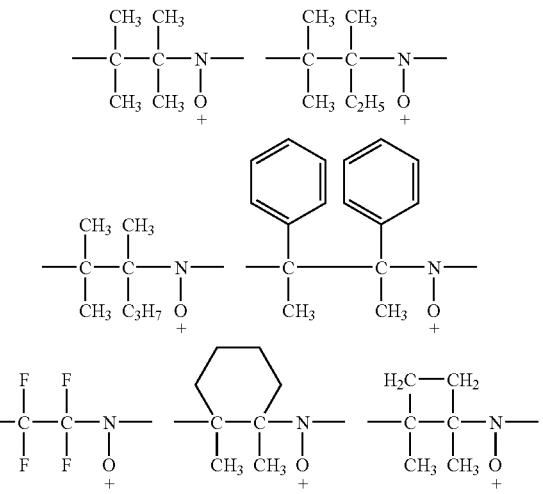

Example of a polymer having a repeating unit represented by formula (1) is shown below as a polymer represented by formula (2).

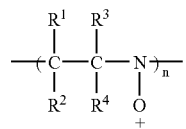
(2)

Referring to formula (2), R1, R2, R3 and R4 each independently represents hydrogen atom, substituted or unsubstituted alkyl group, substituted or unsubstituted aromatic hydrocarbons, substituted or unsubstituted hetroaromatic groups, halogen atom, or alkylene group that may contain either one or both of R1 and R3, R2 and R4, forming a ring.

Examples of R1, R2, R3 and R4 of formula (2) are the previously described R1, R2, R3 and R4 of formula (1). In addition, n represents a positive integer in the formula (2) above. A polymer represented by formula (2) may be a single polymer having one kind of repeating unit, or can be a polymer having more than two kinds of different repeating units. Further, a polymer can have a repeating unit other than a repeating unit represented by formula (1). Amount of the repeating unit represented by formula (1) contained in the polymer having the repeating unit represented by formula (1), in the light of capacity per unit weight, the larger the better. For example, it is preferably more than 60 mole %, more preferably more than 70 mole %, and most preferably more than 80 mole %.

Examples of a polymer having a repeating unit represented by formula (1) are the polymers having the configuration represented in the formulae (3) to (10). In the above formulae (3) to (9), n represents a positive integer. A polymer represented by formula (10) can be a random copolymer or block copolymer. In the formula, n and m denote composition ratios.

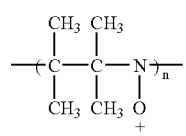
(3)

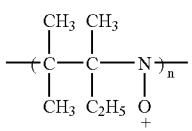
(4)

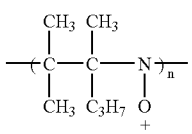
(5)

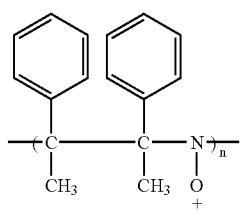
(6)

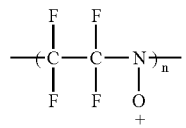
(7)

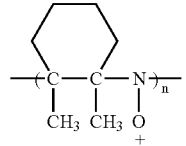
(8)

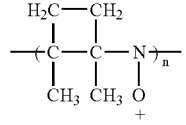
(9)

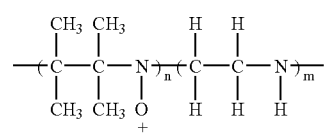
(10)

A polymer having a repeating unit represented by formula (1) is obtained by the following methods, for example. First of all, an aziridin derivative represented by formula (11) below is synthesized, and a polymer represented by formula (12) below is synthesized by cationic ring-opening polymerization. Examples of usable catalysts of the cationic ring-opening polymerization include: boron trifluoride, boron trifluoride diethyl etherate complex, aluminium chloride, ethylaluminum dichloride, diethylaluminum chloride, titanium tetrachloride, tin tetrachloride, sulfuric acid, trifluoromethan sulfate, p-toluenesulfonate, phosphoric acid, perchloric acid, and diethyl sulfate. From the obtained polymer, a polymer is obtained by oxidizing with organic peroxide compounds such as hydrogen peroxide, t-butyl-hydro-peroxide, benzoyl peroxide; organic peroxides such as peracetic acid, perbenzoic acid, m-chloroperbenzoic acid; and oxidizing agent such as peroxosulfuric acid.

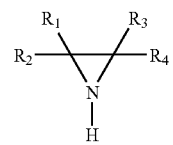
(11)

Referring to formula (11), R1, R2, R3 and R4 each independently represents hydrogen atom, substituted or unsubstituted alkyl group, substituted or unsubstituted aromatic hydrocarbons, substituted or unsubstituted hetroaromatic groups, halogen atom, or alkylene group that may contain either one or both of R1 and R3, R2 and R4, forming a ring.

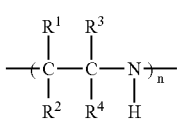
(12)

Referring to formula (12), R1, R2, R3 and R4 each independently represents hydrogen atom, substituted or unsubstituted alkyl group, substituted or unsubstituted aromatic hydrocarbons, substituted or unsubstituted hetroaromatic groups, halogen atom, or alkylene group that may contain either one or both of R1 and R3, R2 and R4, forming a ring.

Examples of R1, R2, R3 and R4 of the formulae (11) and (12) are the previously described R1, R2, R3 and R4 of the formula (1). In addition, n represents a positive integer in the formula (12). The polymer represented in formula (12) may be a single polymer having one kind of repeating unit, or can be a polymer having more than two kinds of different repeating units.

The aziridin derivative represented by formula (11) being a raw material it is synthesized according to the method disclosed in the Journal of the American Chemical Society, Vol. 82, p. 6068-6070 (1960) by G. L. Closs and S. J. Brois.

In general, a radical concentration may be expressed as a spin concentration. That is, a spin concentration is determined by, for example, an absorption area intensity in an electron spin resonance (ESR) spectrum as spin amount per unit weight of the active material of the present invention. The spin concentration of the active material in the present invention, normally, is preferably maintained at 1020 spins/g and more, and more preferably maintained at 5×1020 spins/g and more, for example, more than 1 seconds, preferably more than 1 hour, and more preferably more than 24 hours.

The polymer of the secondary battery of the present invention can be solid or can be dispersed state or dissolved state to the electrolyte. However, when using solid state, from the notion of suppressing the decline in a capacity due to solubility to electrolyte solution, the polymer is preferably showing insoluble or low solubility to electrolyte solution. In addition, according to one of the electrodes in a battery of the present invention, a polymer having a repeating unit represented by formula (1) as active material can be used alone or in combination of more than two kinds. Also, it can be combined to other active material.

According to the battery of the present invention, a polymer having a repeating unit represented by formula (1) is utilized as active material electrode reaction of one of positive or negative electrode reaction or both electrode reactions. However, in the case of using this polymer as active material of one electrode, then the conventionally known active material is utilized as active material of other electrode.

For example, when a polymer having a repeating unit represented by formula (1) is used as negative electrode, for example, then transition metal oxide particles, disulfide compounds, conductive polymers and the like can be used as the active materials of the positive electrode. Examples of the transition metal oxides include: lithium manganese oxides such as $LiMnO_2$ and $LiXMn_2O_4$ (0<x<2); and lithium manganese oxides having spinel structures such as $MnO_2$, $LiCoO_2$, $LiNiO_2$, and $LiXV_2O_5$ (0<x<2). Examples of the disulfide compounds include: dithioglycol; 2,5-dimercapto-1,3,4-thiadiazole; and s-triazine-2,4,6-trithiol. Examples of the conductive polymers include polyacetylene, polyphenylene, polyaniline and polypyrrole. In the present invention, these active materials of the positive electrode can either be used alone or in combination of two or more kinds. Also, in the positive electrode, these positive electrode materials and a polymer having a repeating unit represented by formula (1) may be combined to be utilized as the combined active material.

On the other hand, when a polymer having a repeating unit represented by formula (1) is used in a positive electrode, then the examples of the active materials of the negative electrode include graphite, amorphous carbon, lithium metal, lithium alloy, lithium ion absorbing carbon, and conductive polymers. No special limitations is imposed upon the shapes of these active materials. For example, the lithium metal can be utilized as thin film, bulk, solidified powders, fibers, and flakes. These negative electrode materials can be utilized alone or in combination of two or more kinds. Also, the already known active materials and the polymer can be combined and used as negative electrode.

[2] Conductive Auxiliary Material And Ion-Conductive Auxiliary Material

A conductive auxiliary material or ion-conductive auxiliary material may be added for reducing an impedance during forming an electrode by using a polymer having a repeating unit represented by formula (1). Examples of such a material include carbonaceous particles such as graphite, carbon black and acetylene black and conductive polymers such as polyaniline, polypyrrole, polythiophene, polyacetylene and polyacene as a conductive auxiliary material as well as a gel polymer electrolyte and a solid polymer electrolyte as an ion-conductive auxiliary material.

[3] Binder

A binder may be combined to electrode material for reinforcing binding between various components of the electrode. Examples of a binder include polytetrafluoroethylene, polyvinylidene fluoride, a copolymer of vinylidene fluoride and hexafluoropropylene, a copolymer of vinylidene fluoride and tetrafluoroethylene, a copolymer rubber of styrene and butadiene, and resin binders such as polypropylene, polyethylene, polyimide, and various polyurethane.

[4] Catalyst

A catalyst which assists oxidation and reduction reactions may be combined to electrode material for accelerating an electrode reaction. Examples of a catalyst include conductive polymers such as polyaniline, polypyrrole, polythiophene, polyacetylene and polyacene; basic compounds such as pyridine derivatives, pyrrolidone derivatives, benzimidazole derivatives, benzothiazole derivatives and acridine derivatives; and metal-ion complexes.

[5] Collector And Separator

The negative electrode collector and the positive electrode collector may be a metal foil, metal plate, or mesh made of, for example, nickel, aluminum, copper, gold, silver, an aluminum alloy and stainless steel and carbon. The collector may be active as a catalyst or an active material may be chemically bound to a collector. Also, as a separator having insulating property made of a porous film made of polyethelene and polypropylene or a nonwoven fabric may be used for preventing short circuit of the above positive electrode and the negative electrode by being in contact with one another.

[6] Electrolyte

In the present invention, an electrolyte transfers charged carriers between the negative electrode and the positive electrode, and an ion conductivity of 10-5 to 10-1 S/cm at 20° C. is generally preferred. As an electrolyte, for example, the electrolyte salt is dissolved in the solvent which can be utilized as an electrolyte solution.

The following known materials can be utilized as an electrolyte salt, for example, $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$.

Examples of a solvent used in an electrolyte solution are organic solvents such as ethylene carbonate, propylene carbonate, dimethyl carbonate, diethyl carbonate, methyl ethyl carbonate, γ-butyrolactone, tetrahydrofurane, dioxolane, sulforane, dimethylformamide, dimethylacetamide and N-methyl-2-pyrrolidone. These solvents may be used alone or in combination of more than two types.

Furthermore, in the present invention, an electrolyte may be solid. Examples of a polymer compound used in the solid electrolyte include vinylidene fluoride polymers such as polyvinylidene fluoride, a copolymer of vinylidene fluoride and hexafluoropropylene, a copolymer of vinylidene fluoride and ethylene, a copolymer of vinylidene fluoride and monofluoroethylene, a copolymer of vinylidene fluoride and trifluoroethylene, a copolymer of vinylidene fluoride and tetrafluoroethylene and a terpolymer of vinylidene fluoride, hexafluoropropylene and tetrafluoroethylene; acrylonitrile polymers such a copolymer of acrylonitrile and methyl methacrylate, a copolymer of acrylonitrile and methyl acrylate, a copolymer of acrylonitrile and ethyl methacrylate, a copolymer of acrylonitrile and ethyl acrylate, a copolymer of acrylonitrile and methacrylic acid, a copolymer of acrylonitrile and acrylic acid and a copolymer of acrylonitrile and vinyl acetate; polyethylene oxide; a copolymer of ethylene oxide and propylene oxide; and polymers of these acrylates or methacrylates. The polymer compound may include an electrolyte solution to form a gel or the polymer compound may be used as it is.

[7] Structure Of A Battery

In the present invention, the structures of a battery are not particularly limited and the conventionally known shape can be adopted. For example, an electrode laminate or its rolled laminate is sealed in, for example, by a metal case, a resin case or a laminate film made of a metal foil such as aluminum foil and a synthetic resin film. It may take an external shape of, but not limited to, cylindrical, prismatic, coin or sheet.

[8] The Methods Of Producing The Batteries

The methods of producing the batteries are not particularly limited and various methods depending on materials can be adopted. For example, the slurry made by mixing a solvent to the electrode components including active material is coated on the current collector, then the solvents are volatilized at room temperature or by heating, and after that the opposite electrode is laminated via a separator, or it is further rolled, covered with an exterior body, and an electrolyte solution injected, and sealing it. Examples of solvents for making a slurry include ether group solvents such as tetrahydrofuran, and diethyl ether; amine group solvent such as N-methyl pyrrolidone; aromatic hydrocarbon group solvents such as benzene, toluene and xylene; aliphatic hydrocarbon group solvents such as hexene and peptane; and halogen group hydrocarbon solvents such as chloroform and dichloromethane.

In the methods of producing the batteries, a polymer having a repeating unit represented by formula (1) (the nitroxyl radical polymer) as descried above may be used as it is as electrode material, or also chemical compounds which are converted to the nitroxyl radical polymers by the electrode reactions may be used. In the latter case, as examples of chemical compounds converted to the nitroxyl radical polymers by the electrode reactions are: lithium or sodium salt comprising electrolyte anions such as lithium and sodium ions and cations which reduced the nitroxyl radical polymer; or a salt comprising electrolyte anions such as PF6- and BF4- and cation which oxidized the nitroxyl radical polymer.

In the present invention, a lead is taken out from the electrode and conventional method already known can be adopted as conditions of producing other parts such as exterior.

EMBODIMENTS

Specific examples of the present invention are explained hereinbelow; however, the present invention is not restricted by these embodiments.

Embodiment 1

300 mg of poly (2,2,3,3-tetramethyl-ethylene-nitroxyl) which is a chemical compound represented by formula (A), 600 mg of graphite-powders, and 100 mg of polytetrafluoroethylene resin binder were measured, and they are dry mixed by kneading for 10 minutes using an agate mortar. As a result of measuring the molecular weight of the poly(2,2,3,3-tetramethyl-ethylene-nitroxyl) by GPC, the weight-average molecular weight is 8900 (vs polystyrene conversion) and the dispersion ratio (weight-average molecular weight/number-average molecular weight) is 1.82.

The obtained mixture was extended to a thin film by applying pressure with a roller. After drying it overnight at 80° C. inside a vacuum, it was punched to a circular shape of 12 mm diameter. The coin-shaped positive electrode is formed accordingly. The weight of this electrode is 18.8 mg.

Then, the obtained electrode was immersed into an electrolyte solution to impregnate the electrolyte solution into the pores inside the electrode. An ethylenecarbonate-diethylcarbonate mixed solution (mixture ratio 3:7 by volume) including 1 mol/L of electrolytic salt LiPF6 is used as the electrolyte solution.

The electrode impregnated with the electrolyte solution, as shown in FIG. 1, was placed on a positive collector, and a porous polypropylene film separator impregnated with the electrolyte solution in the likewise method was piled above the electrode.

Furthermore, a lithium metal plate forming a negative electrode was piled on the separator, and a negative collector equipped with an insulating filler of the frame type was piled on the lithium metal plate. The layered body was compressed by caulking machine and was enclosed. The coin-shape battery that uses the poly (2,2,3,3-tetramethyl-ethylene-nitroxyl) as positive active material, and uses lithium metal as negative active material was obtained.

To the coin-shaped battery produced, it is charged by sending a constant current of 1 mA until reaching the voltage of 4.2 V, and after that discharging were carried out at a constant current of 1 mA. As a result of that, the voltage became constant for 48 minutes at the region of 3.6 V, and suddenly dropped after that. Its performance as a battery was confirmed from this. The battery is charged again at the voltage drop of 2.2V, and further, charging and discharging tests were repeated 50 times in the region of 4.2 to 2.2 V. As a result of the tests, constant voltages were observed at the region of 3.6 V and the performance as a secondary battery was confirmed. The capacity of this coin-shaped battery is 188 mAh per 1 g of positive electrode active material. Also, the ratio of charging capacity 50 times/discharging capacity 1 time is 98.2%.

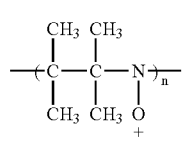

(A)

Embodiment 2

The coin-shaped battery was produced according to the same method as in Embodiment 1 except for using the poly (2,2,3-trimethyl-3-propylethylene-nitroxyl) represented by formula (B) in place of the poly (2,2,3,3-tetramethyl-ethylene-nitroxyl). The weight of positive electrode of this coin-shaped battery is 20 mg.

To the coin-shaped battery produced, it is charged by sending a constant current of 1 mA until reaching the voltage of 4.2 V, and after that discharging were carried out at a constant current of 1 mA. As a result of that, the voltage became constant for 48 minutes at the region of 3.6 V, and suddenly dropped after that. Its performance as a battery was confirmed from this. The battery is charged again at the voltage drop of 2.2V, and further, charging and discharging tests were repeated 50 times in the region of 4.2 to 2.2 V. As a result of the tests, constant voltages were observed at the region of 3.6 V and the performance as a secondary battery was confirmed. The capacity of this coin-shaped battery is 166.2 mAh per 1 g of positive electrode active material. Also, the ratio of charging capacity 50 times/discharging capacity 1 time is 97.1%.

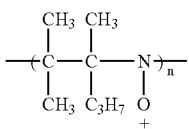

(B)

Embodiment 3

The coin-shaped battery was produced according to the same method as in Embodiment 1 except for using the poly (2,3-dimethyl-2,3-diphenylethylene-nitroxyl) represented by formula (C) in place of the poly (2,2,3,3-tetramethyl-ethylene-nitroxyl). The weight of positive electrode of this coin-shaped battery is 19.1 mg.

To the coin-shaped battery produced, it is charged by sending a constant current of 1 mA until reaching the voltage of 4.2 V, and after that discharging were carried out at a constant current of 1 mA. As a result of that, the voltage became constant for 25 minutes at the region of 3.6 V, and suddenly dropped after that. Its performance as a battery was confirmed from this. The battery is charged again at the voltage drop of 2.2V, and further, charging and discharging tests were repeated 50 times in the region of 4.2 to 2.2 V. As a result of the tests, constant voltages were observed at the region of 3.6 V and the performance as a secondary battery was confirmed. The capacity of this coin-shaped battery is 94.8 mAh per 1 g of positive electrode active material. Also, the ratio of charging capacity 50 times/discharging capacity 1 time is 97.7%.

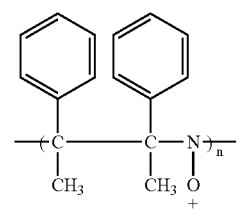

(C)

Embodiment 4

The coin-shaped battery was produced according to the same method as in Embodiment 1 except for using the poly (2,2,3,3-tetrafluroetylene-nitroxyl) represented by formula (D) in place of the poly (2,2,3,3-tetramethyl-ethylene-nitroxyl). The weight of positive electrode of this coin-shaped battery is 17.2 mg.

To the coin-shaped battery produced, it is charged by sending a constant current of 1 mA until reaching the voltage of 4.2 V, and after that discharging were carried out at a constant current of 1 mA. As a result of that, the voltage became constant for 42 minutes at the region of 3.7 V, and suddenly dropped after that. Its performance as a battery was confirmed from this. The battery is charged again at the voltage drop of 2.2V, and further, charging and discharging tests were repeated 50 times in the region of 4.2 to 2.2 V. As a result of the tests, constant voltages were observed at the region of 3.7 V and the performance as a secondary battery was confirmed. The capacity of this coin-shaped battery is 181 mAh per 1 g of positive electrode active material. Also, the ratio of charging capacity 50 times/discharging capacity 1 time is 95.2%.

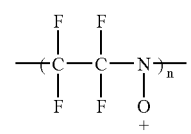

(D)

Comparative Example 1

The coin-shaped battery was produced according to the same method as in Embodiment 1 except for increasing the amount of graphite powders to 900 mg, and without using the poly (2,2,3,3-tetramethyl-ethylene-nitroxyl).

Discharging tests of the battery produced were carried out according to the same method as in Embodiment 1. As a result of the tests, the voltages dropped rapidly without a flat-top portion of the voltage, and its performance as a battery was not confirmed.

In addition, when charging tests of the battery were attempted by sending a constant current of 1 mA, the voltages instantaneously exceeded above 4.5 V. As for discharging tests, however, the flat-top portions in the voltage curves were not observed, which confirmed that this battery did not function as a secondary battery.

Comparative Example 2

A coin-shaped electrode was produced according to the same method as in Embodiment 1 except for using 300 mg of LiCoO$_2$, and without using the poly (2,2,3,3-tetramethyl-ethylene-nitroxyl).

Discharging tests of the battery produced as described above were carried out according to the same method as in Embodiment 1. The capacity per active material was calculated as 94 mAh/g.

According to the present invention, it is possible to produce a battery comprising the safe and light elements as electrode active material by not including heavy metals. In addition to that, the secondary battery having an excellent charging and discharging cycle stability and large capacity (per unit weight) is supplied.

Industrial Applicability

As has been described hereinbefore, according to the method of manufacturing a semiconductor substrate of the present invention, carrying out the first step of implanting ions allows formation of the micro-cavities in the predetermined of the substrate. Further, carrying out the second step of giving the heat treatment to the substrate allows growth and combination of the micro-cavities formed in the substrate in said first step to form the SON semiconductor substrate having a flat-shaped cavity approximately parallel to the substrate surface.

Furthermore, according to the present invention, the high-temperature heat treatment step is carried out for exposing the substrate to the temperature of not less than 1000° C., and therefore the substrate itself is softened by being exposed to the high temperature at the same time as that the micro-cavities formed in the first step grow and combine with each other. As a result, even if the substrate surface is elevated in a portion in which the cavity is formed in a moment when the cavity is formed within the substrate, the substrate surface can return to flatness at once (the elevated portion being smoothed), so that the SON substrate may be manufactured while keeping the flatness of the substrate surface.

In addition, according to the method of manufacturing a semiconductor device of the present invention, leakage current may be reduced more than that of conventional semiconductor devices, and thus the semiconductor device with lower electrical power consumption and higher speed operating characteristics may be easily and inexpensively manufactured.

Moreover, the semiconductor substrate and the semiconductor device of the present invention have realized lower electrical consumption and higher speed operating characteristics.

Having described the present invention in relation to some preferred embodiments and examples, it is to be understood that these embodiments and examples are merely for illustrative purposes of the invention with examples and not restrictive. It will be obvious that upon reading the specification, many changes and substitutions may be made easily by components or technologies equal to those skilled in the art, but that such changes and substitutions fall within the scope and spirit as set out in the appended claims.

What is claimed is:

1. A secondary battery comprising at least a positive electrode, a negative electrode, and an electrolyte, wherein at least one of the positive electrode and the negative electrode comprises a polymer having a repeating unit represented by formula (1) as an active material:

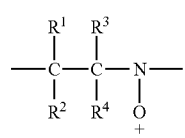

(1)

wherein R1, R2, R3 and R4 each independently represents a hydrogen atom, a substituted or unsubstituted alkyl group, a substituted or unsubstituted aromatic hydrocarbon, a substituted or unsubstituted hetroaromatic group, a halogen atom or an alkylene group that may be coupled to at least one or both of R1 and R3, and R2 and R4, to form a ring.

2. The secondary battery according to claim 1 containing the polymer as a positive electrode active material.

3. The secondary battery according to claim 1, wherein the secondary battery is a lithium secondary battery.

4. A secondary battery comprising at least a positive electrode, a negative electrode, and an electrolyte, wherein at least one of the positive electrode and the negative electrode comprises a polymer represented by formula (2) as an active material:

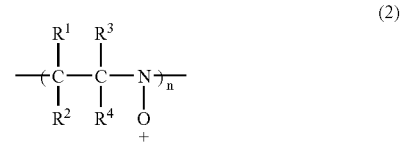

wherein R1, R2, R3 and R4 each independently represents a hydrogen atom, a substitated or unsubstituted alkyl group, a substituted or unsubstituted aromatic hydrocarbon, a substituted or unsubstituted hetro aromatic group, a halogen atom, or an alkylene group that may be coupled to at least one or both of R1 and R3, and R2 and R4, to form a ring, and wherein n represents a positive integer.

5. The secondary battery according to claim 4 containing the polymer as a positive electrode active material.

6. The secondary battery according to claim 4, wherein the secondary battery is a lithium secondary battery.

7. A secondary battery comprising at least a positive electrode and a negative electrode, wherein polymer is a reactant or product of an electrode reaction of at least a positive electrode and a negative electrode, wherein the polymer has a repeating unit represented by formula (1):

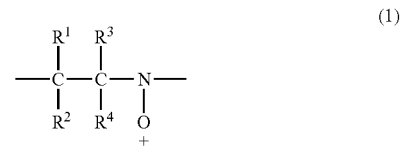

and wherein R1, R2, R3 and R4 each independently represents a hydrogen atom, a substituted or unsubstituted aikyl group, a substituted or unsubstituted aromatic hydrocarbons, a substituted or unsubstituted hetroaromatic group, a halogen atom, or an alkylene group that maybe coupled to at least one of or both of R1 and R3, and R2 and R4, to form a ring.

8. The secondary battery according to claim 7 containing the polymer as a reactant or product of the positive electrode reaction.

9. The secondary battery according to claim 7, wherein the secondary battery is a lithium secondary battery.

10. A secondary battery comprises at least a positive electrode and a negative electrode, wherein at least one electrode reaction of a positive electrode and negative electrode contains a chemical compound obtained by forming a polymer having a repeating unit represented by formula (1):

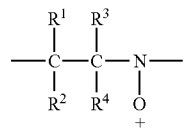 (1)

wherein R1, R2, R3 and R4 each independently represents a hydrogen atom, a substituted or unsubstituted alkyl group, a substituted or unsubstituted aromatic hydrocarbon, a substituted or unsubstituted hetroaromatic group, a halogen atom, an alkylene group that may be coupled to at least one or both of R1 and R3, and R2 and R4, to form a ring.

11. The secondary battery according to claim 10, wherein the chemical compound is contained in the positive electrode.

12. The secondary battery according to claim 10, wherein the secondary battery is a lithium secondary battery.

* * * * *